United States Patent
Janson et al.

(10) Patent No.: US 10,150,368 B2
(45) Date of Patent: Dec. 11, 2018

(54) TRANSAXLE AND POWER TAKE-OFF UNIT

(71) Applicant: Ford Global Technologies, LLC, Dearborn, MI (US)

(72) Inventors: David Allen Janson, Plymouth, MI (US); Matthew David Hammond, Dearborn, MI (US); Gregory Daniel Goleski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 15/232,321

(22) Filed: Aug. 9, 2016

(65) Prior Publication Data
US 2018/0043772 A1    Feb. 15, 2018

(51) Int. Cl.
*B60K 17/344* (2006.01)
*B60K 23/08* (2006.01)
*B60K 5/04* (2006.01)

(52) U.S. Cl.
CPC .............. *B60K 17/344* (2013.01); *B60K 5/04* (2013.01); *B60K 2023/0833* (2013.01); *B60Y 2400/421* (2013.01)

(58) Field of Classification Search
CPC ..................... B60K 17/344; B60K 2023/0833; B60K 5/04; B60K 17/3467; F16H 37/082; B60Y 2400/421
See application file for complete search history.

(56) References Cited

U.S. PATENT DOCUMENTS

| | | | | |
|---|---|---|---|---|
| 4,417,642 A | * | 11/1983 | Suzuki | B60K 17/3467 180/249 |
| 4,441,575 A | * | 4/1984 | Suzuki | B60K 17/3467 180/248 |
| 5,083,478 A | * | 1/1992 | Hiraiwa | B60K 17/344 180/247 |
| 5,685,389 A | * | 11/1997 | Muller | B60K 17/3462 180/233 |
| 5,833,566 A | * | 11/1998 | Showalter | B60K 17/3467 475/198 |
| 5,950,502 A | * | 9/1999 | Genovese | B41F 13/008 74/417 |
| 6,076,623 A | * | 6/2000 | Teraoka | B60K 17/346 180/233 |
| 6,620,069 B2 | | 9/2003 | Palazzolo | |
| 7,140,268 B2 | | 11/2006 | Leposky et al. | |
| 7,448,460 B2 | * | 11/2008 | Morrow | B60K 6/46 180/53.1 |
| 9,016,150 B2 | * | 4/2015 | Perakes | B60K 25/06 180/242 |
| 2012/0029779 A1 | * | 2/2012 | Dickinson | F16H 48/32 701/69 |
| 2014/0357445 A1 | | 12/2014 | Brooks | |

(Continued)

*Primary Examiner* — David J Hlavka
(74) *Attorney, Agent, or Firm* — James Dottavio; Brooks Kushman P.C.

(57) ABSTRACT

A transaxle is designed to accommodate a power take-off unit (PTU). The transaxle utilizes a chain to transmit power from the engine axis to the differential axis and utilizes planetary final drive gearing on the differential axis. The transaxle includes layshaft gearing to transfer power from the driven sprocket to a PTU axis, bypassing the planetary final drive gearing. The PTU may be fixedly driveably connected to the driven sprocket or selectively driveably connected via a dog clutch.

10 Claims, 4 Drawing Sheets

(56) References Cited

U.S. PATENT DOCUMENTS

2016/0114680 A1\* 4/2016 Pritchard ............... B60K 17/34
                                                                                  180/245
2016/0243936 A1\* 8/2016 Yoshimura ........... B60K 17/344
2016/0303966 A1\* 10/2016 Horie ...................... F16D 11/14

\* cited by examiner

TRANSAXLE AND POWER TAKE-OFF UNIT

TECHNICAL FIELD

This disclosure relates to the field of vehicle drivelines. More particularly, the disclosure pertains to a transaxle adapted for use in an all-wheel-drive vehicle.

BACKGROUND

Two vehicle powertrain configurations predominate the modern passenger vehicle market, rear wheel drive (RWD) and front wheel drive (FWD). With additional hardware, both of these configurations can be configured to direct power to all four wheels. Because traction at any particular wheel may be limited at certain times, the ability to direct power to all four vehicle improves mobility. However, the additional hardware introduces additional parasitic losses which increase fuel consumption even in conditions that do not require the additional capability.

In a typical RWD configuration, the engine is oriented longitudinally in the vehicle such that the crankshaft axis is aligned with the direction of vehicle movement. A transmission mounted to the engine drives a rear driveshaft at a speed which may be less than or greater than the speed of the engine crankshaft according to current vehicle requirements. The rear driveshaft is connected to a rear axle that changes the axis of rotation, reduces the rotational speed, and drives left and right rear wheels via half-shafts while permitting slight speed differences between the wheels as the vehicle turns a corner. A RWD configuration is adapted to also drive the front wheels by adding a transfer case between the transmission and the rear driveshaft. In addition to driving the rear driveshaft, the transfer case drives a front driveshaft that, in turn, drives a front axle. Some transfer cases include a planetary gear set that divides the torque between front and rear driveshafts while allowing slight speed differences. Other transfer cases have an actively controlled torque on demand (TOD) clutch that only drives the front driveshaft in certain conditions, such as when a controller senses loss of traction of the rear wheels.

In a typical FWD configuration, the engine is oriented transversely in the vehicle such that the crankshaft axis is aligned with the axis of wheel rotation. A transmission mounted to the engine drives a front differential at a speed suitable for current vehicle requirements. The front differential is typically integrated into a common housing with the transmission gearbox. The front differential drives left and right front half-shafts while permitting slight speed differences between the half-shafts as the vehicle turns a corner. A FWD configuration is adapted to also drive the rear wheels by adding a power take off unit (PTU) that drives a rear driveshaft at a speed proportional to the speed of the front differential. A rear drive unit (RDU) typically includes a TOD clutch that, when engaged, drives a rear axle that, in turn, drives left and right rear half-shafts.

SUMMARY OF THE DISCLOSURE

A transaxle includes a differential, a planetary gear set, and first and second layshaft gears. The differential is configured to transmit torque from a differential input to two half-shafts while permitting speed differences between the half-shafts. The planetary gear set is configured to constrain the differential input to rotate slower than a first sprocket. The differential input and the first sprocket are both supported for rotation about a differential axis. The first layshaft gear is fixedly coupled to the first sprocket and meshes with the second layshaft gear. A power take-off unit (PTU) shaft may be coupled, fixedly or selectively, to the second layshaft gear. The transaxle may also include a gearbox configured to transmit power from an input shaft to a second sprocket at a variety of speed ratios and a chain continuously engaging the first and second sprockets.

A vehicle includes a power take-off unit and a transaxle. The power take-off unit is configured to transmit power from a PTU shaft on a PTU axis to a driveshaft. The transaxle is configured to transmit power at a variety of speed ratios from an engine to two front half-shafts. The transaxle includes a chain which transmits power from an engine axis to a differential axis and layshaft gearing which transmits power from the differential axis to the PTU shaft. The PTU shaft may be either fixedly driveably connected to the chain or selectively driveably connected to the chain via a disconnect clutch. The disconnect clutch may be a dog clutch. The PTU may include a first bevel gear fixedly coupled to the PTU shaft, a second bevel gear meshing with the first bevel gear, and a driveshaft fixedly coupled to the second bevel gear. The vehicle may further include a rear differential configured to transmit power to left and right rear half-shafts and a rear drive unit configured to selectively driveably connect the driveshaft to the rear differential.

A transaxle includes first and second sprockets, a gearbox, a chain, a differential, a planetary gear set, first and second layshaft gears, and a PTU shaft. The first sprocket is supported for rotation about an input shaft. The gearbox is configured to transmit power from the input shaft to the first sprocket at a variety of speed ratios. The second sprocket is supported for rotation about a differential axis. The chain meshes with the first and second sprockets. The differential is configured to transmit torque from a differential input to left and right half-shafts while permitting speed differences between the half-shafts. The planetary gear set is configured to constrain the differential input to rotate slower than the second sprocket. The first layshaft gear is fixedly coupled to the second sprocket and meshes with the second layshaft gear. The PTU shaft is coupled, fixedly or selectively, to the second layshaft gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. Two rotatable elements are driveably connected if they are connected by a power flow path that constrains their rotation speeds to be proportional with a predetermined speed ratio. If the power flow path is established in all operating conditions, then the components are fixedly driveably connected. If the power flow path is established only when one or more shift elements are engaged, then the components are selectively driveably connected.

Figure 1:
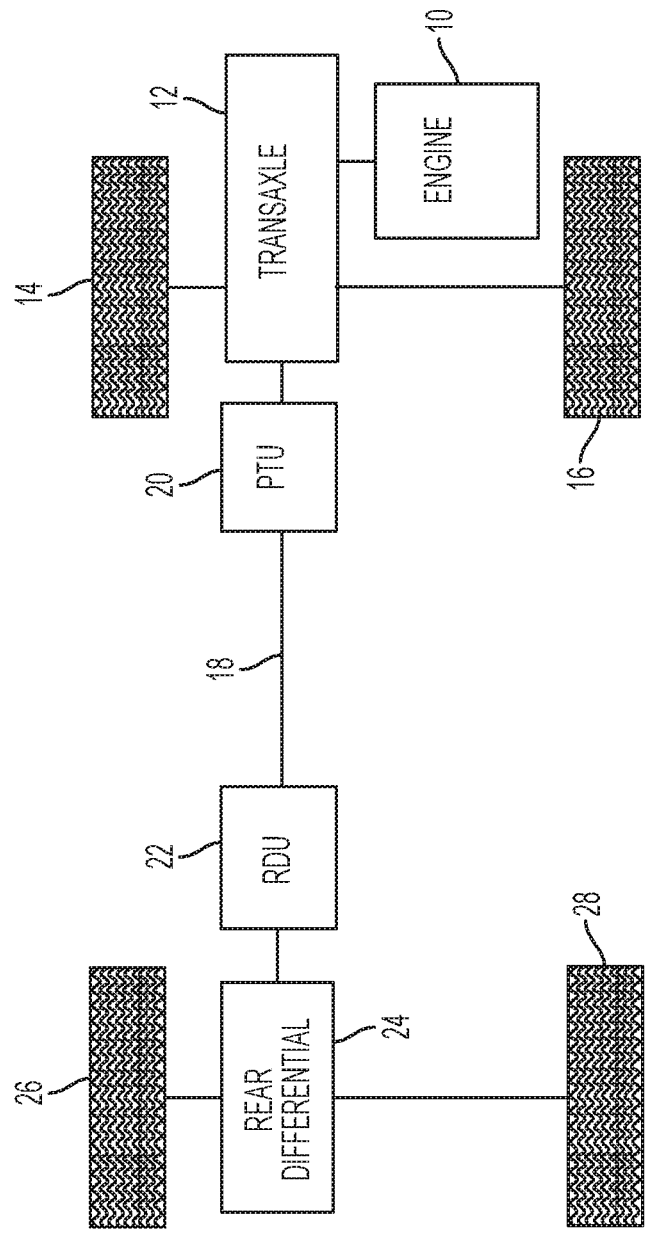
FIG. 1 is a schematic diagram of a vehicle powertrain.

FIG. 1 schematically illustrates an all-wheel drive vehicle powertrain. The heavy lines indicate the flow of mechanical power. An internal combustion engine 10 generates mechanical power by converting stored chemical energy in a fuel source. Transaxle 12 adapts the speed and torque of the mechanical power produced by the engine to suit the current needs of the vehicle. Transaxle 12 includes a multiple-ratio gearbox and also a front differential that provides roughly equal torque to left and right front wheels 14 and 16 while accommodating slight differences in speed such as when the vehicle turns a corner. Transaxle 12 also drives driveshaft 18 via Power Take-off Unit (PTU) 18. In some embodiments, driveshaft 18 is driven whenever the front wheels are driven. In other embodiments, driveshaft 18 may be disconnected in some operating conditions. Rear Drive Unit (RDU) 22 selectively transmits power from driveshaft 18 to rear differential 24. Rear differential 24 transmits roughly equal torque to left and right rear wheels 26 and 28 while accommodating slight differences in speed.

Figure 2:
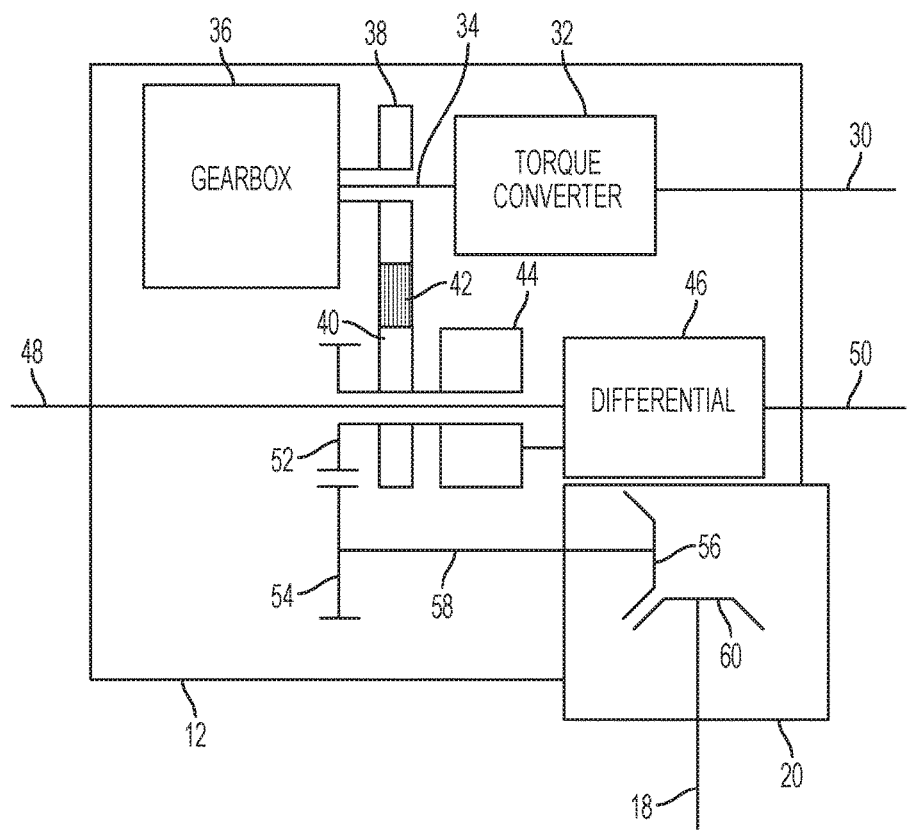
FIG. 2 is a schematic diagram of the internal structure of a transmission and power take-off unit suitable for use in the powertrain of FIG. 1.

FIG. 2 shows the internal structure of transaxle 12 and PTU 20 in more detail. Power from the engine flows into transaxle 12 via the transmission input shaft 30. Torque converter 32 transmits the power to turbine shaft 34. Torque converter 32 transmits torque based on a speed difference between input shaft 30 and turbine shaft 34. When the speed ratio is large, such as when turbine shaft 34 is stationary, torque converter 32 multiplies the torque. Torque converter 32 may also include a lock-up clutch that transmits torque without a speed difference. In some embodiments, torque converter 32 may be replaced with a launch clutch. Gearbox 36 transmits power from turbine shaft 34 to sprocket 38 at a variety of speed ratios. Sprocket 38 is supported for rotation about the same axis as the input shaft and the turbine shaft. Gearbox 36 may be, for example, a planetary gearbox that establishes various power flow paths with differing speed ratios by engaging various combinations of shift elements.

Power is transferred from sprocket 38 to sprocket 40 by belt 42. Final drive gearing 44 multiplies the torque by a fixed ratio and transmits it to differential 46. The final drive gearing may be a simple planetary gear set having a sun gear fixed to sprocket 40, a stationary ring gear, and a carrier fixed to a differential input. Differential 46 distributes the power to a left half-shaft 48 and a right half-shaft 50. The differential may be a bevel gear differential having beveled planetary gears supported to rotate with respect to a differential carrier and meshing with left and right side bevel gears. Alternatively, differential 46 may be a double pinion planetary gear set with a ring gear as the differential input, a sun gear fixed to one of the half-shafts, and a carrier fixed to the other half-shaft.

Sprocket 40 is also fixed to a first layshaft gear 52. Sprocket 40 and first layshaft gear 52 are each supported for rotation about a differential axis. Left and right half-shafts 48 and 50 rotate about axes that intersect the differential axis at relatively small angles. Universal joints, such as constant velocity joints, may be utilized to accommodate these small angles. First layshaft gear 52 meshes continuously with second layshaft gear 54. Second layshaft gear 54 and first bevel gear 56 are both fixed to PTU shaft 58. In some embodiments, one of the gears may be selectively coupled to PTU shaft 58 by a disconnect clutch. These components rotate about a PTU axis that is offset from and substantially parallel to the input shaft axis and the differential axis. These three axis are not necessarily co-planar. The first bevel gear 56 meshes with second bevel gear 60 which is fixed to driveshaft 18. Driveshaft 18 may have multiple sections separated by universal joints to accommodate slightly different axes of rotation in PTU 20 and in RDU 22.

Figure 3:
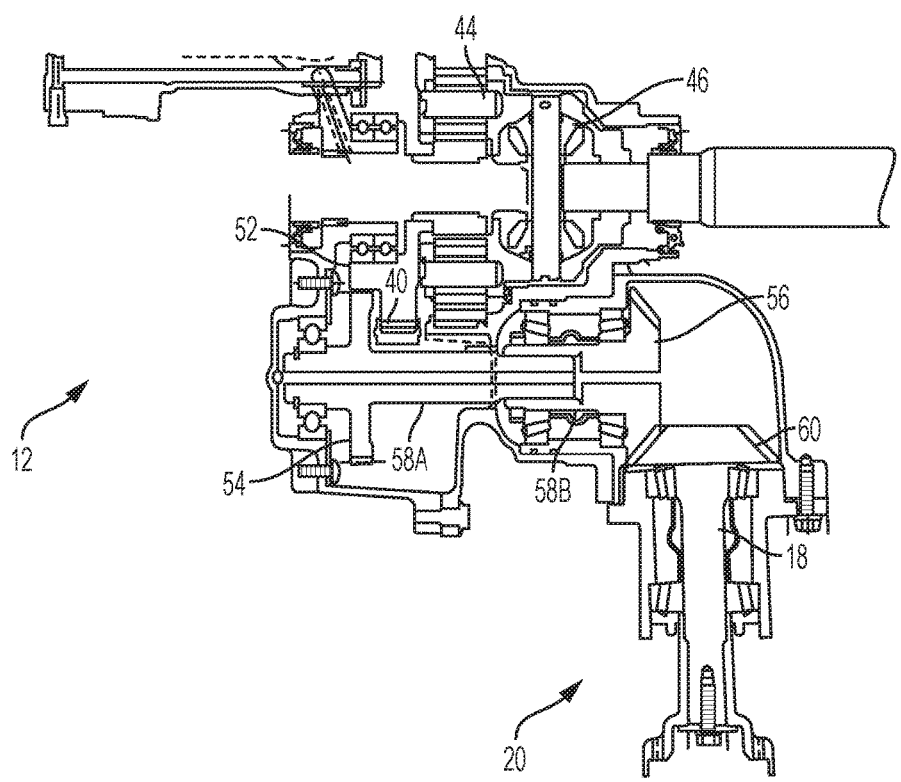
FIG. 3 is a cross section of the transmission and power take-off unit of FIG. 2.

FIG. 3 shows the final drive portion of transaxle 12 and power take-off unit 20 in more detail. A portion 58A of PTU shaft 58 is in transaxle 12 and another portion 58B is in PTU 20. These two portions are joined when the PTU is assembled to the transaxle.

The integrated transaxle and power take-off unit of FIGS. 2 and 3 offer several advantages relative to an add-on power take-off unit. An add-on unit would typically be driven by the differential carrier which rotates at a slower speed than sprocket 40 due to the multiplication provided by the final drive gearing 44. Consequently, gearing is needed to drive driveshaft 18 at a suitable speed. Gearing which changes the speed ratio typically has higher parasitic loss than gearing that merely changes the axis of rotation with relatively little speed change, such as gears 52 and 54 and bevel gears 56 and 60. Furthermore, in this arrangement, only the power to the front wheels flows through the final drive gearing 44, reducing the parasitic losses associated with that gearing.

Figure 4:
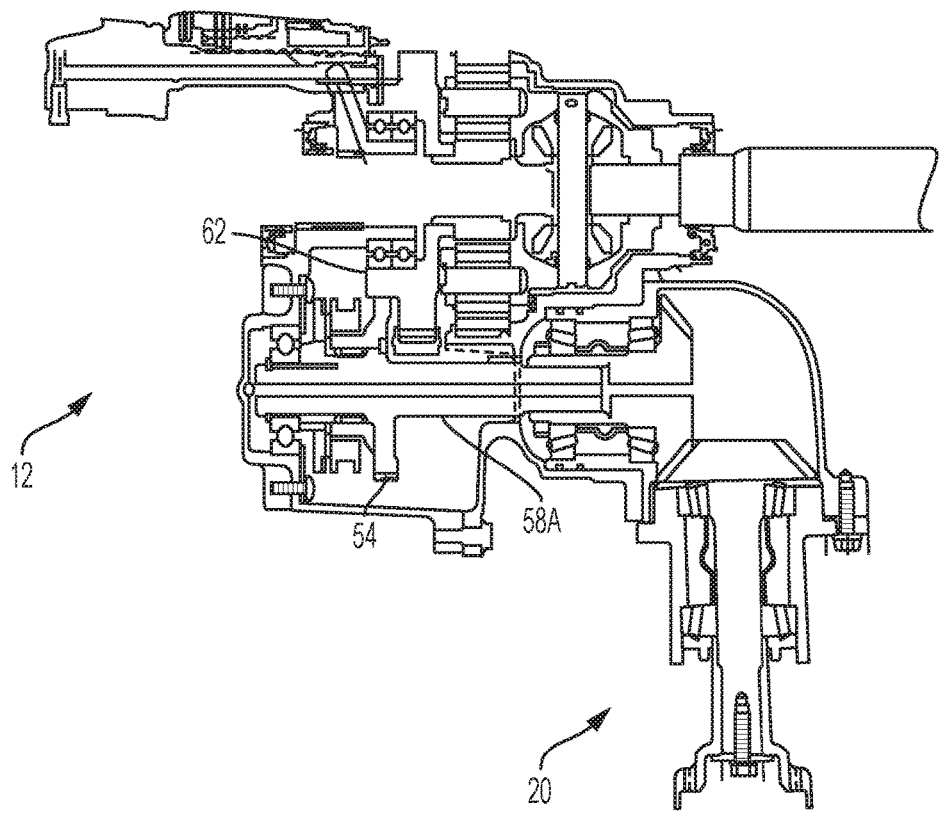
FIG. 4 is a cross section of an alternative transmission and power take-off unit suitable for use in the powertrain of FIG. 1.

FIG. 4 shows an alternate embodiment. In this embodiment gear 54 is supported for rotation with respect to shaft 58A. Dog clutch 62 selectively couples gear 54 to shaft 58A. When dog clutch 62 is in the disengaged state, and RDU 22 is disengaged, the PTU shaft and driveshaft are stationary which reduces the parasitic losses and improves fuel economy. Dog clutch 62 may be engaged when the vehicle is stationary. When the vehicle is moving, RDU can be engaged to bring the PTU shaft close to the same speed as gear 54 before engaging dog clutch 62.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transaxle comprising:
   a differential configured to transmit torque from a differential input to two half-shafts while permitting speed differences between the half-shafts;
   a planetary gear set configured to constrain the differential input to rotate slower than a first sprocket, the differential input and the first sprocket both supported to rotate about a differential axis; and
   a first layshaft gear fixedly coupled to the first sprocket and continuously meshing with a second layshaft gear.

2. The transaxle of claim 1 further comprising a power take-off unit (PTU) shaft coupled to the second layshaft gear.

3. The transaxle of claim 2 wherein the PTU shaft is fixedly coupled to the second layshaft gear.

4. The transaxle of claim 2 wherein the PTU shaft is selectively coupled to the second layshaft gear by a disconnect clutch.

5. The transaxle of claim 4 wherein the disconnect clutch is a dog clutch.

6. The transaxle of claim 1 further comprising:
   a gearbox configured to transmit power from an input shaft to a second sprocket at a variety of speed ratios; and
   a chain continuously engaging the first and second sprockets.

7. A transaxle comprising:
   a first sprocket supported for rotation about an input shaft;
   a gearbox configured to transmit power from the input shaft to the first sprocket at a variety of speed ratios;
   a second sprocket supported for rotation about a differential axis;
   a chain meshing with the first and second sprockets;
   a differential configured to transmit torque from a differential input to left and right half-shafts while permitting speed differences between the half-shafts;
   a planetary gear set configured to constrain the differential input to rotate slower than the second sprocket;
   a first layshaft gear fixedly coupled to the second sprocket and continuously meshing with a second layshaft gear; and
   a power take-off unit (PTU) shaft coupled to the second layshaft gear.

8. The transaxle of claim 7 wherein the PTU shaft is fixedly coupled to the second layshaft gear.

9. The transaxle of claim 7 wherein the PTU shaft is selectively coupled to the second layshaft gear by a disconnect clutch.

10. The transaxle of claim 9 wherein the disconnect clutch is a dog clutch.

* * * * *